(12) United States Patent
Tung

(10) Patent No.: US 10,706,489 B2
(45) Date of Patent: Jul. 7, 2020

(54) IMAGE PROCESSING DEVICE, IMAGE PROCESSING METHOD, AND PROGRAM FOR GENERATING WATER MARKS

(71) Applicant: Rakuten, Inc., Tokyo (JP)

(72) Inventor: Tony Tung, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 126 days.

(21) Appl. No.: 16/072,502

(22) PCT Filed: Jan. 27, 2016

(86) PCT No.: PCT/JP2016/052368
§ 371 (c)(1),
(2) Date: Jul. 24, 2018

(87) PCT Pub. No.: WO2017/130333
PCT Pub. Date: Aug. 3, 2017

(65) Prior Publication Data
US 2019/0035046 A1   Jan. 31, 2019

(51) Int. Cl.
*G06K 9/00* (2006.01)
*G06T 1/00* (2006.01)
(Continued)

(52) U.S. Cl.
CPC .............. *G06T 1/0071* (2013.01); *G06T 1/00* (2013.01); *G06T 3/40* (2013.01); *H04N 1/387* (2013.01); *G06T 2201/0064* (2013.01)

(58) Field of Classification Search
CPC ............. G06T 2201/0051; G06T 1/005; G06T 2201/0065; G06T 1/00; G06T 1/0071;
(Continued)

(56) References Cited

U.S. PATENT DOCUMENTS 7,222,235 B1 * 5/2007 Mitsui ................... G06F 17/211
380/28
7,310,428 B2 * 12/2007 Anzai ..................... G06T 1/005
382/100

(Continued)

FOREIGN PATENT DOCUMENTS

EP   2518685 A1   10/2012
JP   2002-232685 A   8/2002
(Continued)

OTHER PUBLICATIONS

English translation of the International Search Report for PCT/JP2016/052368.
(Continued)

*Primary Examiner* — Li Liu
(74) *Attorney, Agent, or Firm* — HEA Law PLLC

(57) ABSTRACT

Even when an image in which a watermark is embedded is processed, certainty of detecting the watermark is increased. Image data acquisition unit of an image processing device acquires image data. A watermark generation unit generates watermarks having a plurality of sizes. An image processing unit embeds the respective watermarks having the plurality of sizes generated by the watermark generation unit in an image indicated by the image data acquired by the image data acquisition unit.

9 Claims, 10 Drawing Sheets

(51) Int. Cl.
*H04N 1/387* (2006.01)
*G06T 3/40* (2006.01)

(58) Field of Classification Search
CPC . G06T 2201/0064; G06T 3/40; G06T 1/0021; G06T 5/40; H04N 21/8358; H04N 1/32144; H04N 1/32203; H04N 2201/3233; H04N 1/32208; H04N 1/32304; H04N 1/32309; G06K 19/06075
See application file for complete search history.

(56) References Cited

U.S. PATENT DOCUMENTS

| | | | |
|---|---|---|---|
| 9,710,870 B2* | 7/2017 | Reed | G06T 1/0021 |
| 2002/0104003 A1 | 8/2002 | Iwamura | |
| 2004/0103293 A1* | 5/2004 | Ryan | G06T 1/0064 |
| | | | 713/193 |
| 2005/0068582 A1* | 3/2005 | Ferlitsch | H04N 1/32144 |
| | | | 358/1.18 |
| 2005/0180594 A1* | 8/2005 | Isogai | G06T 1/0071 |
| | | | 382/100 |
| 2005/0190948 A1* | 9/2005 | Isogai | G06T 1/0028 |
| | | | 382/100 |
| 2006/0196950 A1* | 9/2006 | Kiliccote | G06K 7/14 |
| | | | 235/494 |
| 2006/0209349 A1* | 9/2006 | Tabata | G06T 1/005 |
| | | | 358/3.28 |
| 2007/0195337 A1* | 8/2007 | Takayama | B41J 3/4075 |
| | | | 358/1.2 |
| 2013/0236046 A1 | 9/2013 | Nallusamy et al. | |
| 2016/0239935 A1* | 8/2016 | Holstun | G06T 3/00 |
| 2018/0146245 A1* | 5/2018 | Petrovic | H04N 21/8456 |

FOREIGN PATENT DOCUMENTS

| | | |
|---|---|---|
| JP | 2005-192001 A | 7/2005 |
| JP | 2009-200835 A | 9/2009 |
| WO | 2015/047290 A1 | 4/2015 |

OTHER PUBLICATIONS

Maciej Piec, Andreas Rauber, "Real-Time Screen Watermarking Using Overlaying Layer", 2014 9th International Conference on Availability, Reliability and Security, IEEE, Sep. 8 2014, pp. 561-570, XP32702179.

Frederic Lusson, Karen Bailey, Mark Leeneya, Kevin Curran, "A novel approach to digital watermarking, exploiting colour spaces" Signal Processing., vol. 93, No. 5, May 1, 2013, pp. 1268-1294, XP55371985A.

* cited by examiner

IMAGE PROCESSING DEVICE, IMAGE PROCESSING METHOD, AND PROGRAM FOR GENERATING WATER MARKS

CROSS REFERENCE TO RELATED APPLICATIONS

This application is a National Stage of International Application No. PCT/JP2016/052368 filed on Jan. 27, 2016. The contents of the above document is incorporated herein by reference in its entirety.

TECHNICAL FIELD

The present invention relates to an image processing device, an image processing method, and a program.

BACKGROUND ART

Hitherto, there is known a technology of embedding watermarks in an image such as a still image and a motion image. For example, in Patent Literature 1, there is described a technology of embedding watermarks in an image in order to identify a source of the image posted in an unauthorized website.

CITATION LIST

Patent Literature

[PTL 1] US 2013/0236046 A1

SUMMARY OF INVENTION

Technical Problem

However, even when a watermark is embedded in an image, when a user processes image data, the watermark may become unable to be detected. For example, when the user compresses or reduces the size of the image data, and a compression rate or a reduction rate is high, the watermark collapses, and may not be detected. Moreover, for example, when a part of the image is cut or painted over, the watermark is also cut or painted over, and become unable to be detected.

The present invention has been made in view of the above-mentioned problem, and therefore has an object to increase certainty of the detection of a watermark even when an image in which the watermark is embedded is processed.

Solution to Problem

In order to solve the above-mentioned problem, an image processing device according to one embodiment of the present invention includes: image data acquisition means for acquiring image data; watermark generation means for generating watermarks having a plurality of sizes; and image processing means for embedding the respective watermarks having the plurality of sizes generated by the watermark generation means in an image indicated by the image data acquired by the image data acquisition means.

An image processing method according to one embodiment of the present invention includes: an image data acquisition step of acquiring image data; a watermark generation step of generating watermarks having a plurality of sizes; and an image processing step of embedding the respective watermarks having the plurality of sizes generated by the watermark generation means in an image indicated by the image data acquired by the image data acquisition means.

A program according to one embodiment of the present invention causes a computer to function as: image data acquisition means for acquiring image data; watermark generation means for generating watermarks having a plurality of sizes; and image processing means for embedding the watermarks having the respective sizes generated by the watermark generation means in an image indicated by the image data acquired by the image data acquisition means.

Further, an information storage medium according to one embodiment of the present invention is a computer-readable information storage medium having the above-mentioned program stored thereon.

In one aspect of the present invention, the image includes a color image having a plurality of color channels, and the image processing means is configured to embed the respective watermarks having the plurality of sizes in each of the plurality of color channels by changing respective numerical values in the plurality of color channels contained in a pixel value of the color image.

In one aspect of the present invention, the image processing means is configured to embed the watermarks having the plurality of sizes so that a part or all of the watermarks embedded in each of the plurality of color channels overlap one another.

Further, in one aspect of the present invention, the image processing device further includes request reception means for receiving a request for the image data by a user, the watermark contains information for identifying the user requesting the image data, and the image processing device further includes image provision means for providing the image data in which the watermark is embedded by the image processing means to the user who has made the request that is received by the request reception means.

Further, in one aspect of the present invention, the watermark includes a 2D code having a plurality of error collection levels, and the watermark generation means is configured to generate, for each of the plurality of sizes, the 2D code having an error correction level equal to or higher than a reference value.

Further, in one aspect of the present invention, the image processing device further includes extension acquisition means for acquiring an extension of the image data acquired by the image data acquisition means, and the watermark generation means is configured to determine the sizes of the watermarks to be generated based on the extension acquired by the extension acquisition means.

Further, in one aspect of the present invention, the image processing device further includes data size acquisition means for acquiring a data size of the image data acquired by the image data acquisition means, and the watermark generation means is configured to determine a size of the watermark to be generated based on the data size acquired by the data size acquisition means.

Further, in one aspect of the present invention, the image processing means is configured to determine positions at which the respective watermarks having the plurality of sizes are to be embedded so that the sizes of each of the watermarks is reduced as a position of the each of the watermarks approaches a center of the image.

Further, in one aspect of the present invention, the image processing means is configured to embed a plurality of watermark groups each including the respective watermarks having the plurality of sizes.

Advantageous Effects of Invention

According to one embodiment of the present invention, it is possible to increase certainty of the detection of a watermark even when an image in which the watermark is embedded is processed.

DESCRIPTION OF EMBODIMENTS

[1. Hardware Configuration of Image Processing System]

Figure 1:
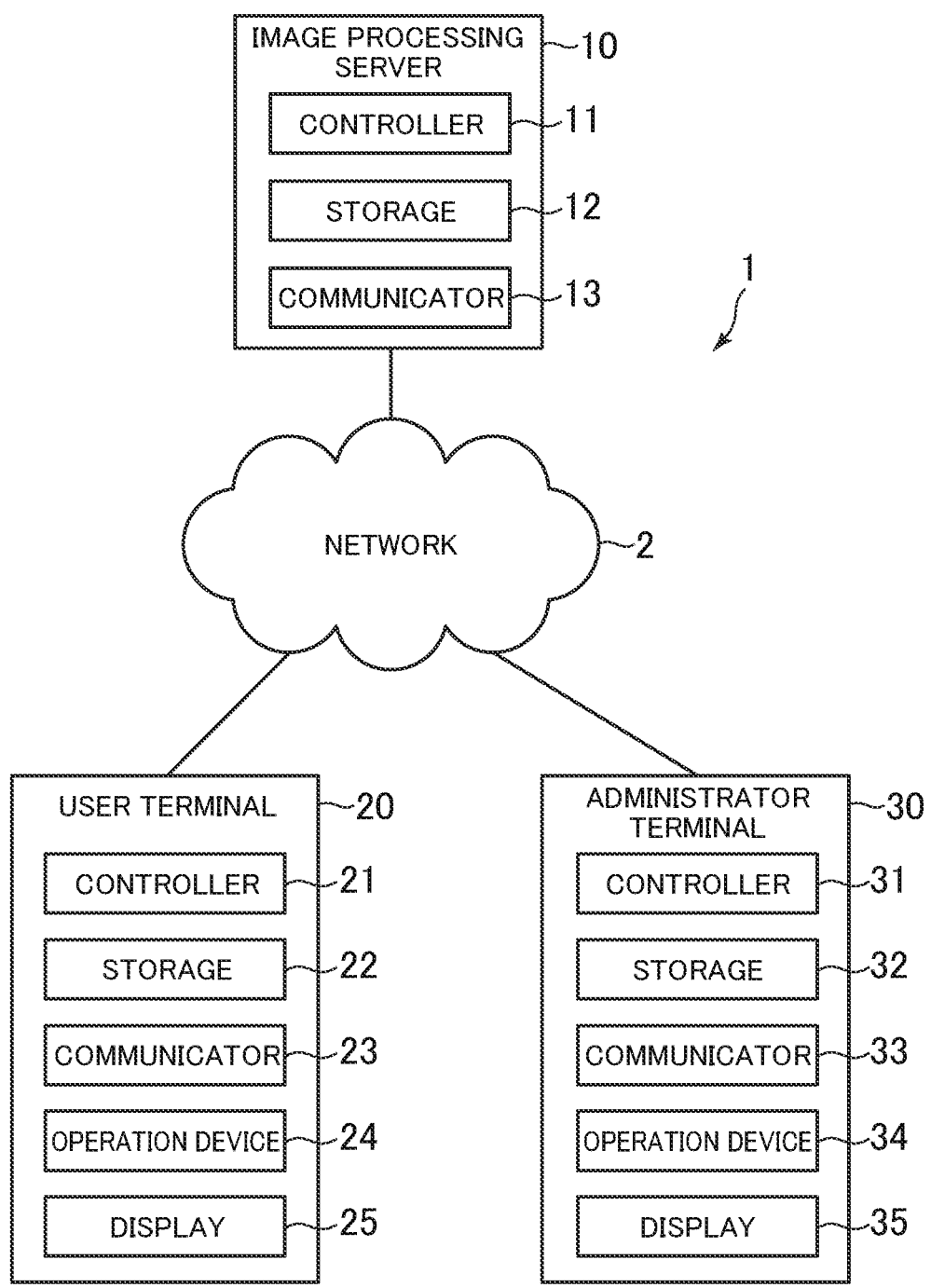
FIG. 1 is a diagram for illustrating an overall configuration of an image processing system in an embodiment of the present invention.

A description is now given of an image processing system including an image processing device according to an exemplary embodiment of the present invention. FIG. 1 is a diagram for illustrating an overall configuration of the image processing system in this embodiment. As illustrated in FIG. 1, the image processing system 1 includes an image processing server 10 (an example of the image processing device), a user terminal 20, and an administrator terminal 30. The image processing server 10, the user terminal 20, and the administrator terminal 30 are connected to one another so as to transmit/receive data to/from one another via a network 2. A description is herein given while assuming that the number of each of the image processing server 10, the user terminal 20, and the administrator terminal 30 is one, but the number of each thereof may be two or more.

The image processing server 10 is a server computer. The image processing server 10 includes a controller 11, a storage 12, and a communicator 13. The controller 11 includes, for example, one or more microprocessors. The controller 11 is configured to carry out processing in accordance with programs and data stored in the storage 12. The storage 12 includes a main storage and an auxiliary storage. For example, the main storage is a RAM, and the auxiliary storage is a hard disk drive, a solid state drive, or the like. The communicator 13 includes a network card. The communicator 13 is configured to carryout data communication via the network 2.

The user terminal 20 is a computer to be operated by a user, and is, for example, a personal computer, a cellular phone (including a smartphone), or a personal digital assistant (including a tablet computer). The user terminal 20 includes a controller 21, a storage 22, a communicator 23, an operation device 24, and a display 25. Hardware configurations of the controller 21, the storage 22, and the communicator 23 are the same as those of the controller 11, the storage 12, and the communicator 13, respectively, and a description thereof is therefore omitted.

The operation device 24 is an input device to be operated by the user, and is, for example, a mouse, a keyboard, and a touch panel. The operation device 24 is configured to transmit details of an operation by the user to the controller 21. The display 25 is, for example, a liquid crystal display or an organic EL display. The display 25 is configured to display a screen in accordance with an instruction of the controller 21.

The administrator terminal 30 is a computer to be operated by an administrator, and is, for example, a personal computer, a cellular phone (including a smartphone), or a personal digital assistant (including a tablet computer). Hardware configurations of a controller 31, a storage 32, a communicator 33, an operation device 34, and a display 35 of the administrator terminal 30 are the same as those of the controller 21, the storage 22, the communicator 23, the operation device 24, and the display 25, respectively, and a description thereof is therefore omitted.

Programs and data described as being stored in the storages 12, 22, and 32 may be supplied to the storages 12, 22, and 32 via the network 2. Moreover, the hardware configurations of the image processing server 10, the user terminal 20, and the administrator terminal 30 are not limited to the above-mentioned examples, and hardware of various computers can be applied thereto. For example, each of the image processing server 10, the user terminal 20, and the administrator terminal 30 may include a reader (for example, an optical disc drive and a memory card slot) configured to read a computer-readable information storage medium. In this case, programs and data stored in an information storage medium may be supplied to the storages 12, 22, and 32 via the reader.

In this embodiment, the image processing server 10 manages images of confidential information on a company for which the user works. For example, the image processing server 10 embeds watermarks having a plurality of sizes in an image requested by the user so as to enable identification of the user when the user intentionally discloses the image to the outside of the company. Thus, even when the user processes the image, certainty of detection of the watermarks is increased. A detailed description is now given of this technology.

[2. Functions to be Implemented in Image Processing System]

Figure 2:
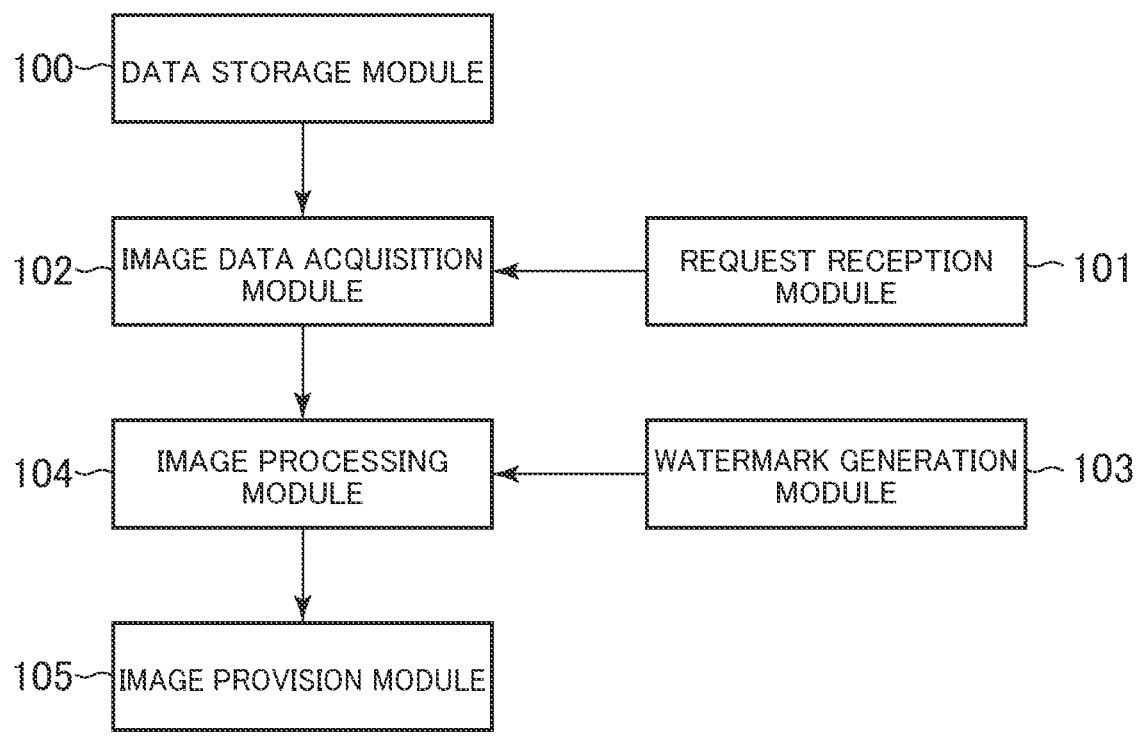
FIG. 2 is a functional block diagram for illustrating an example of functions to be implemented by the image processing system.

FIG. 2 is a functional block diagram for illustrating an example of functions to be implemented in the image processing system 1. In this embodiment, a description is mainly given of functions to be implemented in the image processing server 10. As illustrated in FIG. 2, a data storage module 100, a request reception module 101, an image data acquisition module 102, a watermark generation module 103, an image processing module 104, and an image provision module 105 are implemented in the image processing server 10.

[2-1. Data Storage Module]

The data storage module 100 is implemented mainly by the storage 12. The data storage module 100 is configured to store various types of data for embedding watermarks having a plurality of sizes in an image. For example, the data storage module 100 stores a user database and an image database.

The user database stores information on users who use the image processing system 1. For example, the user database stores user IDs each for uniquely identifying a user, and private information on users. The private information includes, for example, a user name (for example, a name and a user account), an assigned section of the user (for example, a company name and a department to which the user belongs), and contact information of the user (for example, a phone number and an email address).

The image database stores information on image data managed by the image processing server 10. The image data may be still image data or moving image data. Further, the image data may be color image data or grayscale image data. In this embodiment, a description is given of a case in which the image data indicates color still images as an example.

The image data itself or only locations of the image data may be stored in the in the image database. The location of the image data is a storage location of the image data, and is, for example, link information such as a folder (directory) or a URL at which the image data is stored. The image data may be stored in the image processing server 10, or may be stored in another computer connected to the image processing server 10 so that the data can be transmitted/received to/from the image processing server 10. Moreover, a type and a data size of the image data may be stored in the image database. The type of the image data is, for example, an extension of the image data and color depth information.

The data stored in the data storage module 100 is not limited to the above-mentioned example. The data storage module 100 may store various types of data. For example, when information on a creator and administrator of the image data is contained in the watermark, the data storage module 100 may store the information on the creator and the administrator for each piece of the image data.

[2-2. Request Reception Module]

The request reception module 101 is implemented mainly by the controller 11. The request reception module 101 is configured to receive a request for image data by the user. The request for image data is an acquisition request or a display request for the image data. For example, the request reception module 101 receives information (file name, link information, and the like) for identifying image data specified by the user from the user terminal 20, to thereby receive the request for the image data.

[2-3. Image Data Acquisition Module]

The image data acquisition module 102 is implemented mainly by the controller 11. The image data acquisition module 102 is configured to acquire image data. In this embodiment, the user requests the image data stored in the image database, and the image data acquisition module 102 thus acquires the image data specified by the user out of the plurality of pieces of image data stored in the image database.

[2-4. Watermark Generation Module]

The watermark generation module 103 is implemented mainly by the controller 11. The watermark generation module 103 is configured to generate watermarks having a plurality of sizes. The watermark is also referred to as digital watermark, and is generally an image embedded in order to maintain confidentiality of data and protect copyright of data. Visible and invisible watermarks exist, but, in this embodiment, a description is given of a case in which the watermark is invisible.

The watermark contains information on the image stored in the image database. In other words, the watermark contains information on the image in which the watermark itself is to be embedded. This information is information for maintaining the confidentiality of the image and protecting the copyright of the image, and is, for example, information for identifying the user who has requested the image, information for identifying the creator of the image, and information for identifying the administrator of the image. In the following, a description is given of a case in which the watermark contains information for identifying a user who has requested the image data. The information for identifying the user is the information stored in the user database, and is, for example, the user ID, the user name, the assigned section, and the contact information.

Moreover, the watermark may be indicated as an image or a text. In this embodiment, a description is given of a case in which the watermark is indicated as an image. Further, as an example of the image, a description is given of a case in which a code defined by a given standard is used. The code may be a barcode or a 2D code. In the following, a description is given of a case in which the watermark is a 2D code having a plurality of error correction levels. The error correction level indicates an amount (rate) of information that can be corrected out of information stored in the code. Publicly-known various methods can be applied as the error correction method itself, and, for example, an error correction code such as the Reed-Solomon code may be used.

In this embodiment, a description is given of a QR code (trademark) having four error correction levels as an example of the 2D code. In this 2D code, the error correction level increases in the order of the level L, the level M, the level Q, and the level H, and respective error correction performances thereof are approximately 7%, approximately 15%, approximately 25%, and approximately 30%. The watermark generation module 103 generates 2D codes having an error correction level equal to or higher than a reference for each of the plurality of sizes. The error correction level equal to or higher than the reference is an error correction level equal to or higher than a predetermined level out of the plurality of error correction levels. In the following, a description is given of a case in which the watermark generation module 103 generates 2D codes having the level H as watermarks.

Figure 3:
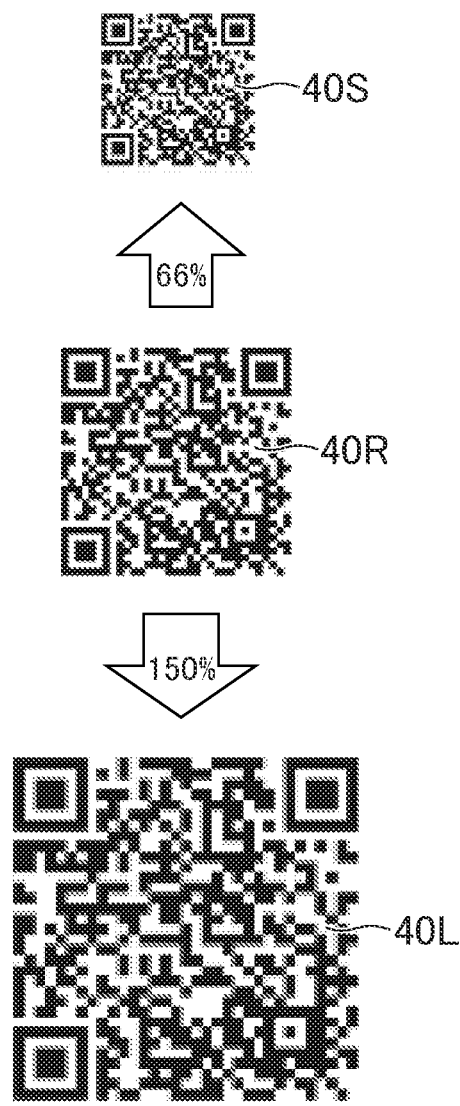
FIG. 3 is a diagram for illustrating an example of watermarks to be generated by a watermark generation module.

FIG. 3 is a diagram for illustrating an example of watermarks to be generated by the watermark generation module 103. As illustrated in FIG. 3, in this embodiment, a description is given of a case in which watermarks 40S, 40R, and 40L having three sizes of 66%, 100%, and 150%, respectively, are generated, but the watermark generation module 103 is only required to generate watermarks having two or more sizes. The number of the sizes is not limited to three, and may be any number. Herein, the size means an amount in terms of area (number of pixels), and the size is determined by, for example, a length, a width, and a resolution (number of pixels per unit length) of the image. When the three watermarks 40S, 40R, and 40L are not particularly distinguished from one another, those watermarks are hereinafter simply referred to as watermarks 40. Moreover, when it is not required to refer to the drawings, reference numerals of images and watermarks are omitted.

The watermark generation module 103 generates the watermark 40 based on an algorithm for converting information to be embedded to code information. A publicly-known coding algorithm or the like is only required to be used as this algorithm. The watermark generation module 103 converts the information to the code based on the algorithm, to thereby generate the watermark 40R having predetermined numbers of pixels in a lengthwise direction and a widthwise direction. Then, the watermark generation module 103 reduces the size of the watermark 40R by a predetermined rate (66% in this case) to generate the watermark 40S, and increases the size by a predetermined rate (150% in this case) to generate the watermark 40L. In other words, the watermark 40S is a watermark having 66% of the lengthwise and widthwise numbers of pixels of the watermark 40R, and the watermark 40L is a watermark having 150% of the lengthwise and widthwise numbers of pixels of the watermark 40R.

[2-5. Image Processing Module]

The image processing module 104 is implemented mainly by the controller 11. The image processing module 104 is configured to embed the respective watermarks having the plurality of sizes generated by the watermark generation module 103 in an image indicated by the image data acquired by the image data acquisition module 102.

Figure 4:
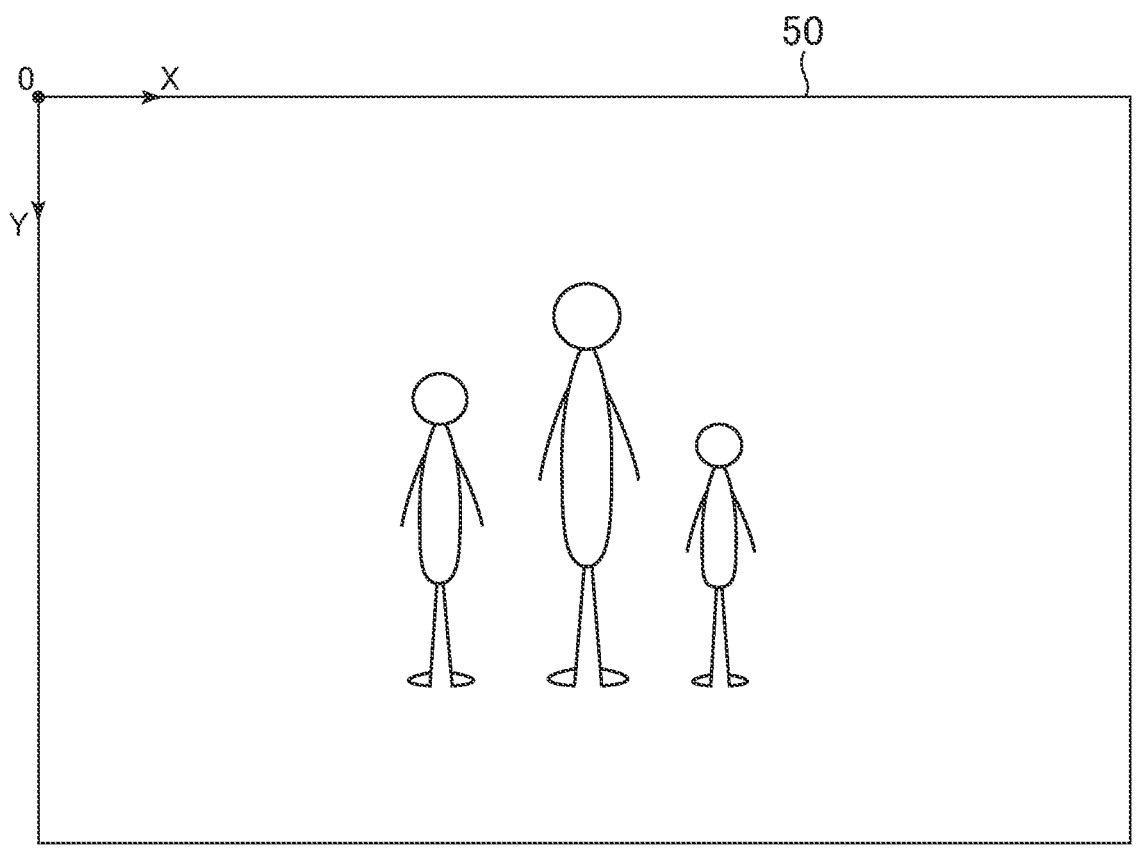
FIG. 4 is a diagram for illustrating an image before the watermarks are embedded.
Figure 5:
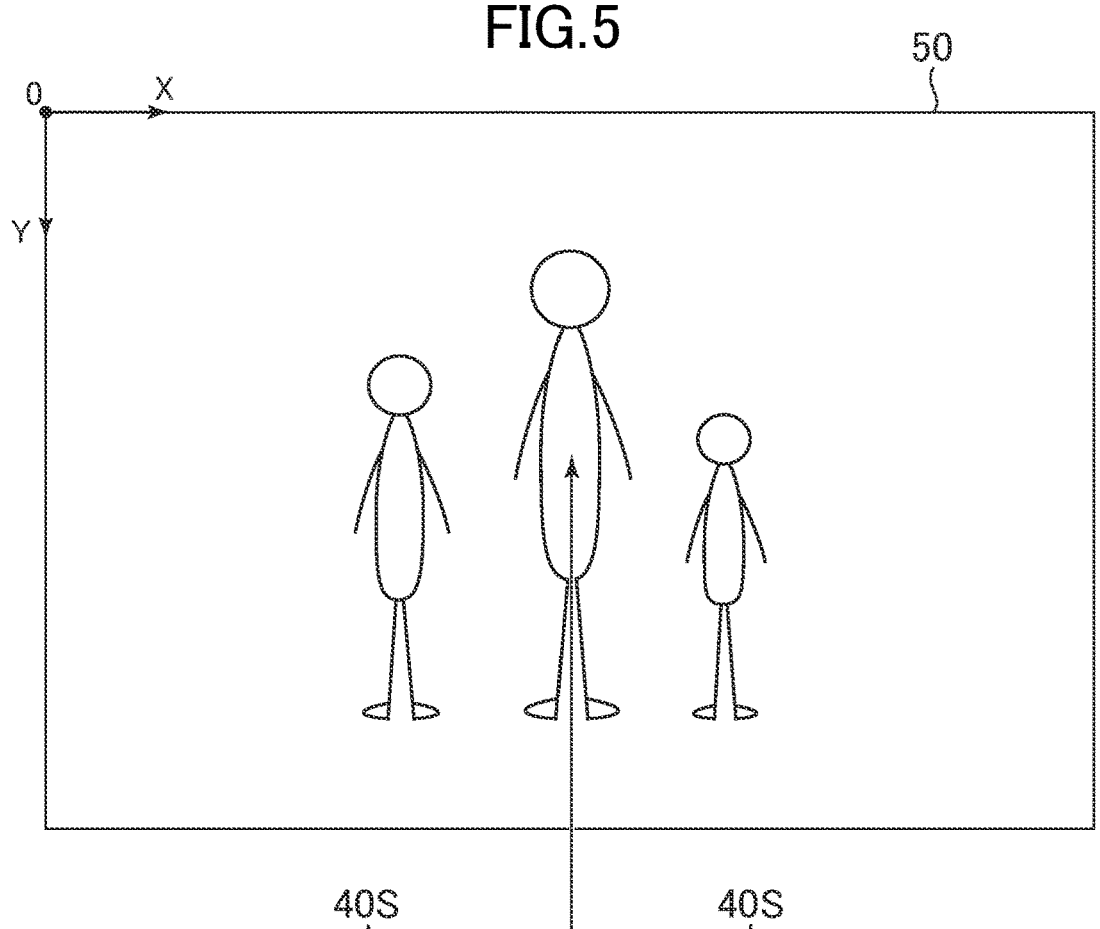
FIG. 5 is a diagram for illustrating how the watermarks are embedded.
Figure 5:
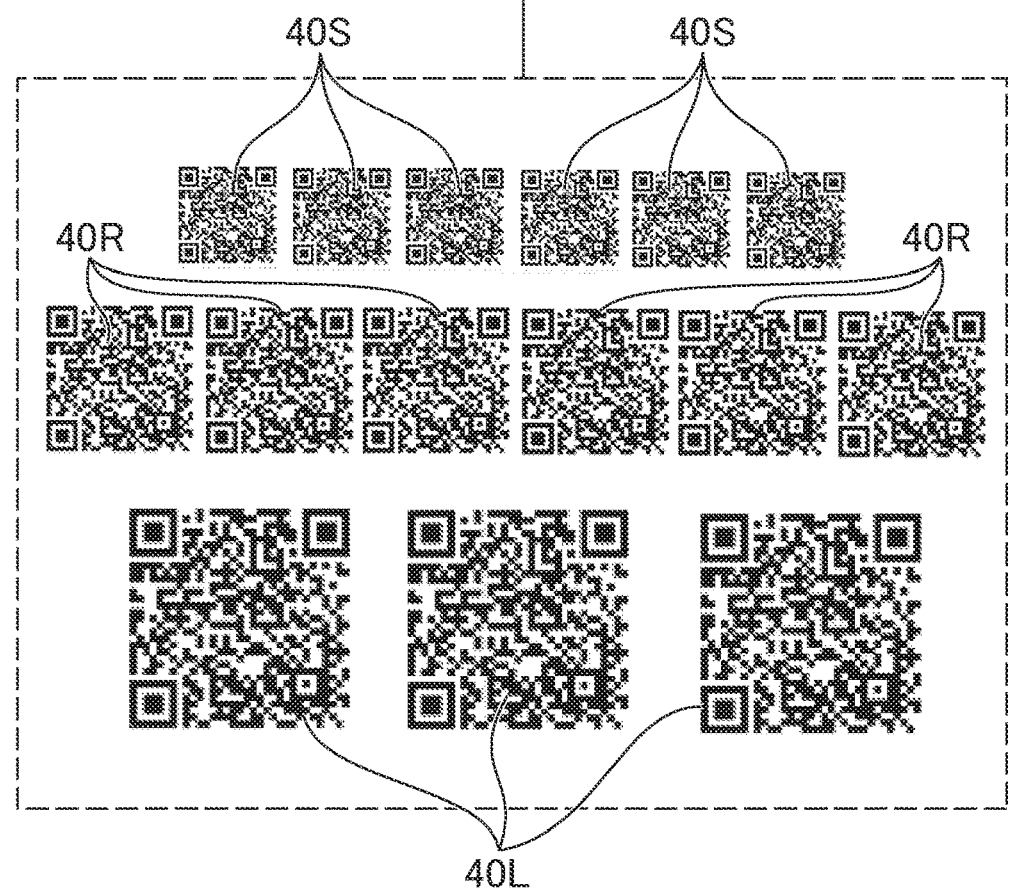

Referring to FIG. 4 and FIG. 5, a description is now given of processing to be carried out by the image processing module 104. FIG. 4 is a diagram for illustrating an image before the watermarks 40 are embedded. In FIG. 4, an upper left corner of an image 50 is set as an origin O of a screen coordinate system (X-Y coordinate system). In this embodiment, a description is given of a case in which the image 50 is a color image, and a pixel value of each of pixels of the image 50 thus contains numerical values in respective color channels. For example, the pixel value of an RGB color image contains a numerical value $R_{xy}$ in a red channel, a numerical value $G_{xy}$ in a green channel, and a numerical value $B_{xy}$ in a blue channel. The characters x and y indicate the coordinates of the pixel. When the RGB color image is a 24-bit image, the numerical value of each of the color channels is represented in 8 bits, and thus takes any numerical value of from 0 to 255.

The image processing module 104 changes the numerical values in the color channels in which the watermarks are to be embedded out of those three numerical values $R_{xy}$, $G_{xy}$, and $B_{xy}$, to thereby embed watermarks 40 in the image 50. The image processing module 104 may change the numerical values $R_{xy}$, $G_{xy}$, and $B_{xy}$ in all the color channels, or may change the numerical values in only apart of the color channels. In other words, the image processing module 104 may embed the watermarks 40 in all the color channels, or may embed the watermarks 40 in a part of the color channels. In this embodiment, a description is given of a case in which the image processing module 104 changes the numerical value $R_{xy}$ in the red channel, to thereby embed the watermarks 40 in the red channel. In other words, the image processing module 104 embeds the watermarks 40 only in the red channel out of the plurality of color channels. Therefore, in FIG. 3 and FIG. 5 described later, the watermarks 40 are illustrated in black, but are actually red. The image processing module 104 may embed the watermarks 40 not in the red channel, but in the green channel or the blue channel, or may embed the watermarks 40 in two or more color channels. A description is given of the case in which the watermarks 40 are embedded in two or more color channels in a modification example of the present invention described later.

FIG. 5 is a diagram for illustrating how the watermarks are embedded. In the example illustrated in FIG. 5, the image processing module 104 embeds the watermarks 40S, 40R, and 40L in the stated order from the top of the image 50. In FIG. 5, a description is given of a case in which the numbers of the watermarks 40R, 40R, and 40L are six, six, and three, respectively, but those numbers may be any number, and each thereof may be one. The image processing module 104 is only required to select positions to embed the watermarks 40 based on a predetermined method, and may determine the positions to embed the watermarks 40 not in the order illustrated in FIG. 5, but randomly. Moreover, in FIG. 5, the watermarks 40S, 40R, and 40L are arranged so as not to overlap one another for the sake of a simple description, but the watermarks 40S, 40R, and 40L may overlap one another as in a modification example of the present invention described later.

As described above, in this embodiment, the watermark 40 is a 2D code. Each of cells of the 2D code takes any one of values of 0 and 1. For example, a cell corresponding to "0" does not have a color, and a cell corresponding to "1" has a color. Herein, not having a color means having the same color as a background color, and having a color means having a color different from the background color. In this case, the watermarks 40 are embedded in the red channel, and a region corresponding to a cell of "0" of the watermark 40 does not have a color of red and a region corresponding to a cell of "1" has the color of red. One cell of the 2D code of the watermark 40 may be constructed of only one pixel or a plurality of pixels of the image. For example, when a watermark 40 large enough to withstand image compression is employed, one cell is only required to be constructed of a plurality of pixels.

For example, the image processing module 104 does not change the pixel value of the pixel corresponding to the cell of "0" of the watermark 40, and changes the pixel value of the pixel corresponding to the cell of "1" of the watermark 40. Specifically, the image processing module 104 does not change the pixel values ($R_{xy}$, $G_{xy}$, $B_{xy}$) of a pixel corresponding to the cell of "0" of the watermark 40, and changes to ($R_{xy}+1$, $G_{xy}$, $B_{xy}$) the pixel values of a pixel corresponding to the cell of "1" of the watermark 40. Thus, the pixel values of the region in which the watermark 40 is embedded only slightly change, and hence, as illustrated in FIG. 5, the watermark 40 is in a state in which the watermark 40 is less likely to be noticeable with the human eyes (invisible state).

A description has been given of the case in which the image processing module 104 increases the numerical value $R_{xy}$ by one, but the image processing module 104 may change the numerical value by two or more. When the change in the numerical value $R_{xy}$ is too large, the invisibility may not be maintained, and the change amounts may thus be less than a threshold (for example, four). Moreover, instead of increasing the numerical value, the image processing module 104 may decrease the numerical value $R_{xy}$. In this case, the image processing module 104 may decrease the pixel value of the pixel corresponding to the cell of "0" of the watermark 40, and may not change the pixel value of the pixel corresponding to the cell of "1" of the watermark 40. Moreover, the change amount of the numerical value $R_{xy}$ may be a fixed value or a variable value.

Moreover, the sizes and numbers of the watermarks 40 to be embedded in the image 50 may be the same for all the pieces of image data stored in the image database, or may be different for each piece of the image data. Further, the sizes and numbers of the watermarks 40 may be fixed values or variable values. When the numbers are variable values, the sizes and numbers of the watermarks 40 may be determined under a certain condition such as the user or the image data, or may randomly be determined.

[2-6. Image Provision Module]

The image provision module 105 is implemented mainly by the controller 11. The image provision module 105 is configured to provide image data (namely, image data having changed pixel values) in which the watermarks are embedded by the image processing module 104 to the user from which the request is received by the request reception module 101. For example, the image provision module 105 may transmit the image data itself in which the watermarks are embedded to the user terminal, or without transmitting the image data itself, transmit only data (display data for a screen) for displaying the image in which the watermarks are embedded on the display 25 to the user terminal.

[3. Processing to be Carried Out in Image Processing System]

A description is now given of watermark embedment processing of embedding watermarks in an image and watermark detection processing of detecting watermarks embedded in an image as examples of processing to be carried out in the image processing system 1. The processing described below is an example of processing to be carried out by the functional blocks illustrated in FIG. 2.

Figure 6:
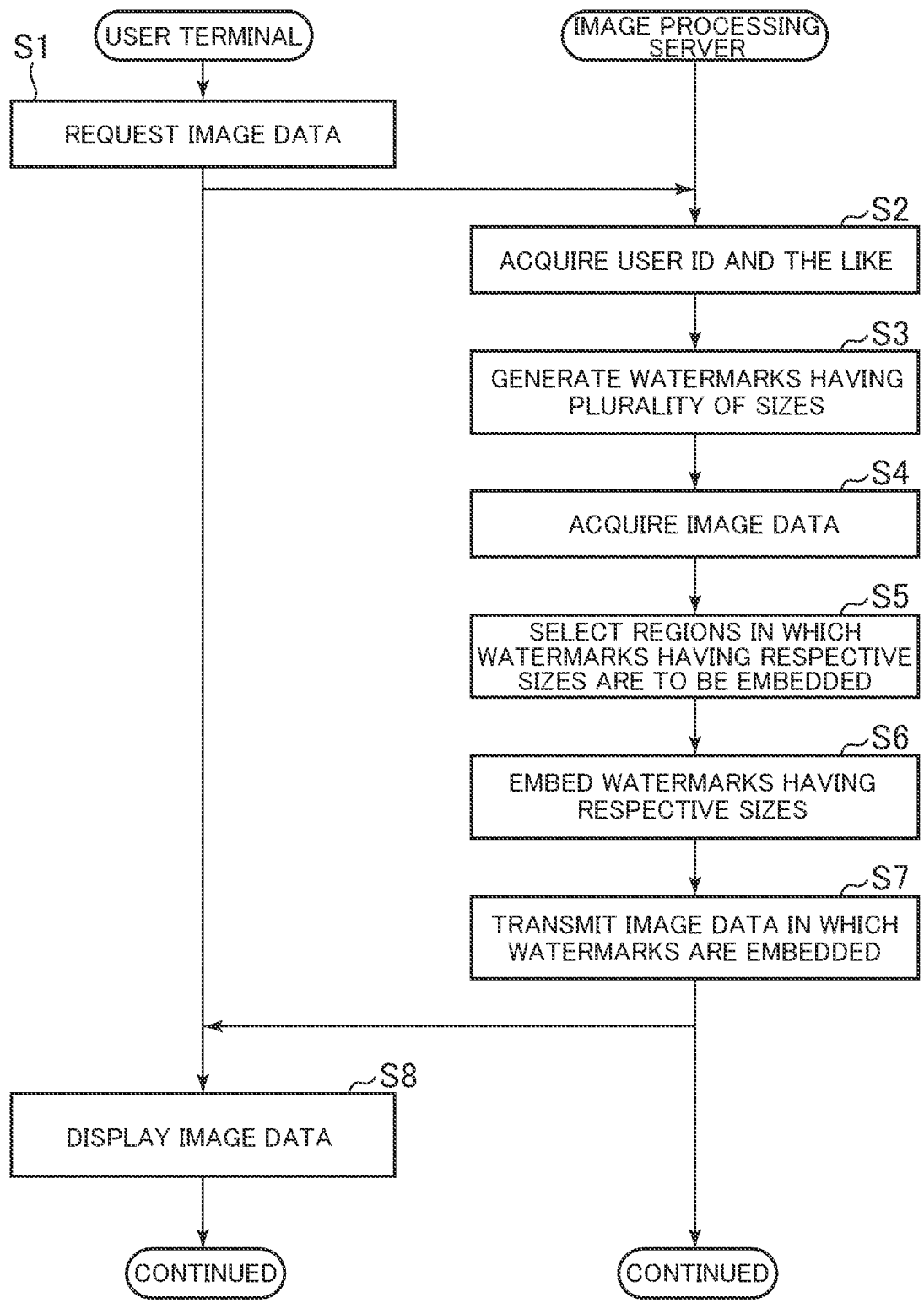
FIG. 6 is a flowchart for illustrating an example of watermark embedment processing.

FIG. 6 is a flowchart for illustrating an example of the watermark embedment processing. The processing illustrated in FIG. 6 is carried out by the controller 11 operating in accordance with the program stored in the storage 12, and the controller 21 operating in accordance with the program stored in the storage 22.

As illustrated in FIG. 6, first, when the user carries out a predetermined operation from the operation device 24 in the user terminal 20, the controller 21 requests image data from the image processing server 10 (Step S1). The request for the image data is only required to be carried out in a predetermined form, and contains, for example, information (file name, link information, and the like) for identifying the requested image data. When the request is transmitted from the user terminal 20 to the image processing server 10, it is assumed that a user ID and an IP address are transmitted, and the image processing server 10 can thus identify which user is making the access.

When the request for the image data is received in the image processing server 10, the controller 11 refers to the user database, and acquires information including the user ID of the user who has requested the image data (Step S2). In Step S2, the controller 11 acquires information to be embedded as the watermarks based on the request for the image data. This information may contain a time and date of the request for the image data by the user, and a time and date of provision of the image data to the user.

The controller 11 generates watermarks having a plurality of sizes based on the information acquired in Step S2 (Step S3). For example, it is assumed that a program for generating the watermarks is stored in the storage 12. In this embodiment, the 2D code is used as the watermark, and a publicly-known 2D code builder may thus be used. The 2D code builder is capable of setting the error correction level of the 2D code to be generated, and the error correction level is the level H in this case. Moreover, it is assumed that information indicating the sizes of the watermarks to be generated is stored in advance in the storage 12. In Step S3, the controller 11 inputs the information acquired in Step S2 into the 2D code builder, to thereby generate the watermarks. The 2D code builder may generate the watermarks having the respective sizes, or the 2D code builder may generate the watermark only in one size, and the controller 11 may increase or reduce the size of this watermark to generate the watermarks having the respective sizes.

The controller 11 refers to the image database, to thereby acquire the image data requested by the user (Step S4). The controller 11 selects regions in which the respective watermarks having the plurality of sizes generated in Step S3 are to be embedded out of an image indicated by the image data (Step S5). In Step S5, the controller 11 selects the region in which the watermarks are to be embedded for each of the plurality of sizes. For example, when the watermarks are to be embedded as illustrated in FIG. 5, the controller 11 selects the regions in the order of the watermarks 40S of 66%, the watermarks 40R of 100%, and the watermarks 40L of 150% from the top of the image 50.

The controller 11 embeds the respective watermarks having the plurality of sizes generated in Step S3 in the regions selected in Step S5 (Step S6). In Step S6, the controller 11 changes the numerical values $R_{x,y}$ in the regions in which the watermarks are to be embedded based on the method described with reference to FIG. 4 and FIG. 5. The controller 11 transmits the image data in which the watermarks are embedded in Step S6 to the user terminal 20 (Step S7). When the image data is received in the user terminal 20, the controller 21 displays the received image data on the display 25 (Step S8), and the processing is finished.

When the watermark embedment processing described above is carried out, the user is brought into a state in which the user can upload the received image data, a screen shot of the display 25, and the like to a computer on the network 2. The watermark detection processing described below is processing of detecting the watermarks embedded in the image uploaded to the computer on the network 2 in the administrator terminal 30.

Figure 7:
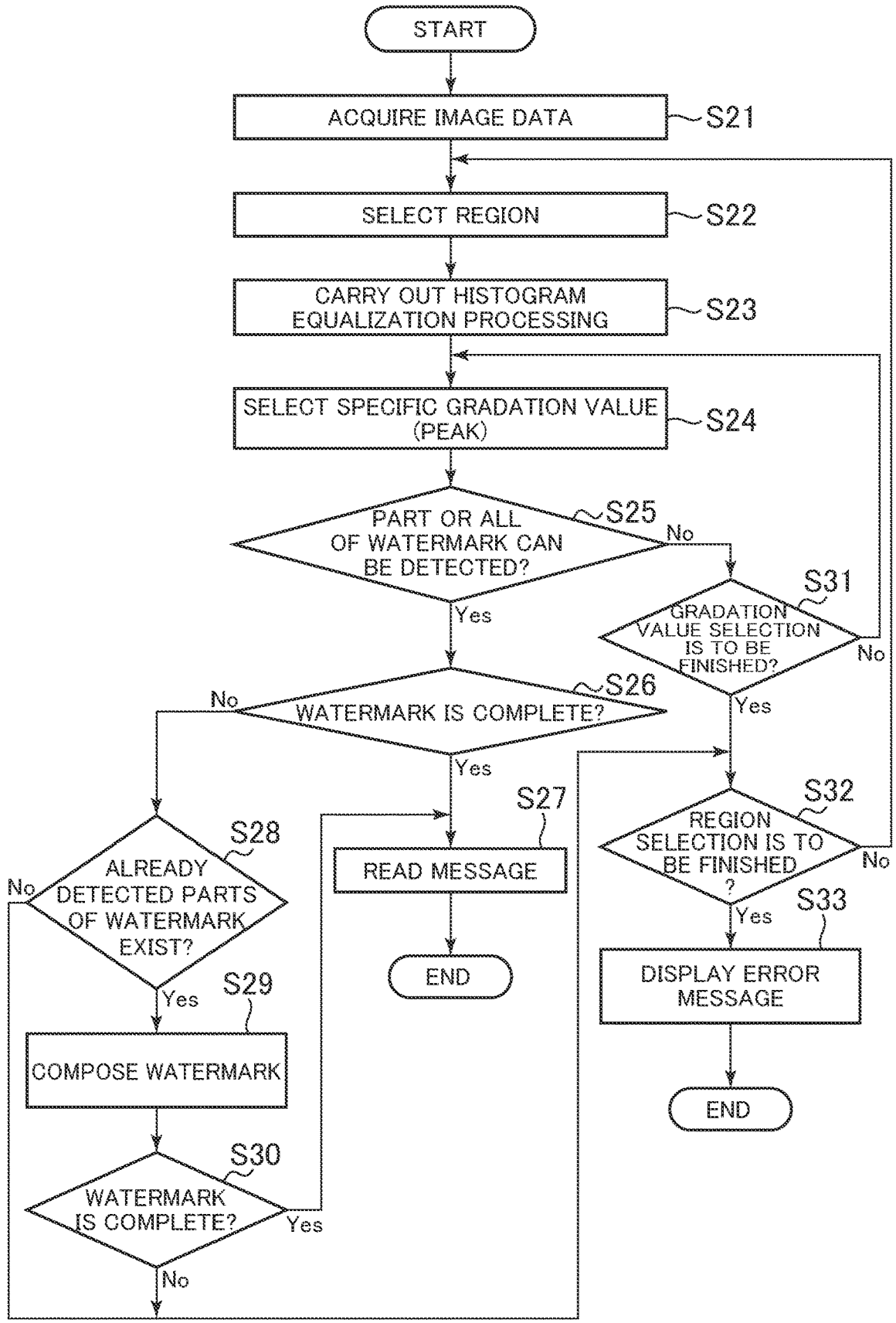
FIG. 7 is a flowchart for illustrating an example of watermark detection processing.

FIG. 7 is a flowchart for illustrating an example of the watermark detection processing. The processing illustrated in FIG. 7 is carried out by the controller 31 operating in accordance with a program stored in the storage 32. As illustrated in FIG. 7, first, the controller 31 acquires the image data disclosed on the computer on the network 2 (Step S21). In Step S21, the controller 31 may receive the image data from the computer on the network 2, or may read out the image data downloaded to the storage module 32 in advance.

The controller 31 selects a region in the image indicated by the image data acquired in Step S21 (Step S22). In Step S22, the controller 31 is only required to select the region in the image based on a predetermined method, and may sequentially select a region having a predetermined size from a predetermined position in the image, or may randomly select a region. Processing starting from Step S22 is carried out for the color channel in which the watermarks are embedded. In this embodiment, the watermarks are embedded in the red channel, and the processing starting from Step S22 is thus carried out for the red channel. When the watermarks are embedded in a plurality of color channels as in the modification example described later, the processing starting from S22 is carried out for each of the color channels.

The controller 31 carries out histogram equalization processing for the region selected in Step S22 (Step S23). The histogram equalization processing is processing of converting respective pixel values so that a graph indicating a cumulative value of the frequency in the histogram becomes linear. Even when an uneven distribution exists in the gradation value of an image, an even distribution in the gradation value can be achieved by applying the histogram equalization processing to the image. As the histogram equalization processing itself, publicly-known various types of processing can be applied. In Step S23, the controller 31 carries out the histogram equalization processing for the red channel, and thus generates a histogram in the red channel. The histogram equalization processing may be applied to the entire image, but through application of the histogram equalization processing to a part of the regions, distances between peaks in each of the gradation values can be increased, and hence the watermarks tend to appear more remarkable. Consequently, the watermarks can be detected more easily.

The controller 31 refers to the histograms generated in Step S23, to thereby select a specific gradation value (or a peak) (Step S24). In Step S24, the controller 31 compares frequencies appearing in the histogram with a threshold, and selects a gradation value at which the frequency equal to or more than a reference appears. This threshold is assumed to be stored in the storage 32.

The controller 31 determines whether or not a part or all of the watermark can be detected at the specific gradation value selected in Step S24 (Step S25). In Step S25, the controller 31 determines whether or not predetermined patterns contained in the watermark are detected. When the 2D code is used as the watermark as in this embodiment, the controller 31 searches for the three finder patterns arranged at corners of the 2D code. For example, when one or two finder patterns are detected, the controller 31 determines that a part of the watermark is detected, and when the three finder patterns are detected, the controller 31 determines that all of the watermark is detected.

When it is determined that a part or all of the watermark can be detected (Y in Step S25), the controller 31 determines whether or not the detected watermark is complete (Step S26). Moreover, when the 2D code is used as the watermark as in this embodiment, in Step S26, the controller 31 is only required to determine whether or not the watermark can be read by a publicly-known 2D code reader. Moreover, for example, the controller 31 may determine whether or not predetermined patterns contained in the watermarks have been detected. The pattern may be the same as or different from the pattern used in the determination in Step S25. In Step S26, the controller 31 may determine whether or not the alignment pattern, the timing pattern, or format information has been detected through use of the pattern matching.

When it is determined that the watermark is complete (Y in Step S26), the controller 31 reads a message contained in the watermark, and displays the message on the display 25 (Step S27), and the processing is finished. In Step S27, the controller 31 displays on the display 25 the information contained in the watermark, for example, the user ID.

On the other hand, when it is determined that the watermark is not complete (N in Step S26), the controller 31 refers to the storage 32, and determines whether or not parts of the watermark that have already been detected exist (Step S28). It is assumed that parts of the watermark that were previously detected in Step S25 are stored in the storage 32.

When it is determined that parts of the watermark exist (Y in Step S28), the controller 3l composes the part of the watermark detected in Step S25 and the parts of the watermark that have already been detected (Step S29). In Step S29, the controller 31 arranges predetermined patterns contained in each of the parts of the watermarks at predetermined positions, to thereby compose the watermark. For example, when the 2D code is used as the watermark as in this embodiment, the finder patterns are arranged at the three corners, and the finder patterns contained in the respective parts of the watermark are thus arranged at the corners.

The controller 31 determines whether or not the watermark composed in Step S29 is complete (Step S30). The processing in Step S30 is the same as that in Step S26. When the watermark is determined to be complete (Y in Step S30), in Step S27, the message is read out, and the processing is finished. On the other hand, when the watermark is determined not to be complete (N in Step S30), the processing proceeds to Step S32.

When it is determined in Step S25 that a part or all of the watermark cannot be detected (N in Step S25), the controller 31 determines whether or not the selection of the gradation value in Step S24 is to be finished (Step S31). In Step S31, the controller 31 determines whether or not a gradation value that has not been selected yet exists. When it is determined that the selection of the gradation value is not to be finished (N in Step S31), the controller 31 returns to the processing in Step S24, and the detection processing for the watermark is carried out for a next gradation value.

On the other hand, when it is determined that the selection of the gradation value is to be finished (Y in Step S31), the controller 31 determines whether or not all regions have been selected in Step S22 (Step S32). When it is determined that a region that has not been selected exists (N in Step S32), the controller 32 returns to the processing in Step S22, and the detection processing for the watermark is carried out for a next region.

On the other hand, when it is determined that the selection of the region is to be finished (Y in Step S32), the controller 31 displays on the display 35 an error message indicating that the watermark has failed to be detected (Step S33), and the processing is finished.

With the above-mentioned image processing system 1, the image processing server 10 embeds the watermarks having the plurality of sizes in the image, and hence, even when the image in which the watermarks are embedded is processed, the detection of the watermarks can be facilitated. For example, even when the user compresses or cuts the image, a probability of detecting watermarks can be increased by embedding, in one image, large watermarks resistant against the compression and the reduction in size and small watermarks resistant against the cutting and the painting over.

Moreover, the information for identifying the user who has requested the image data from the image processing server 10 is contained in the watermarks, and hence, for example, even when the user leaks an image that is confidential information on a company, the user can be identified from the watermarks. As a result, the leakage of the image can be prevented beforehand.

Moreover, the 2D code having the error correction level equal to or higher than the reference is used as the watermark, and hence, even when a part of the watermark has failed to be detected due to processing by the user or a relationship with colors in an original image, correction of this error is facilitated. Thus, the information embedded in the watermark can more accurately be extracted.

[4. Modification Examples]

The present invention is not limited to the above-mentioned embodiment. The present invention may appropriately be modified without departing from the purport of the present invention.

Figure 8:
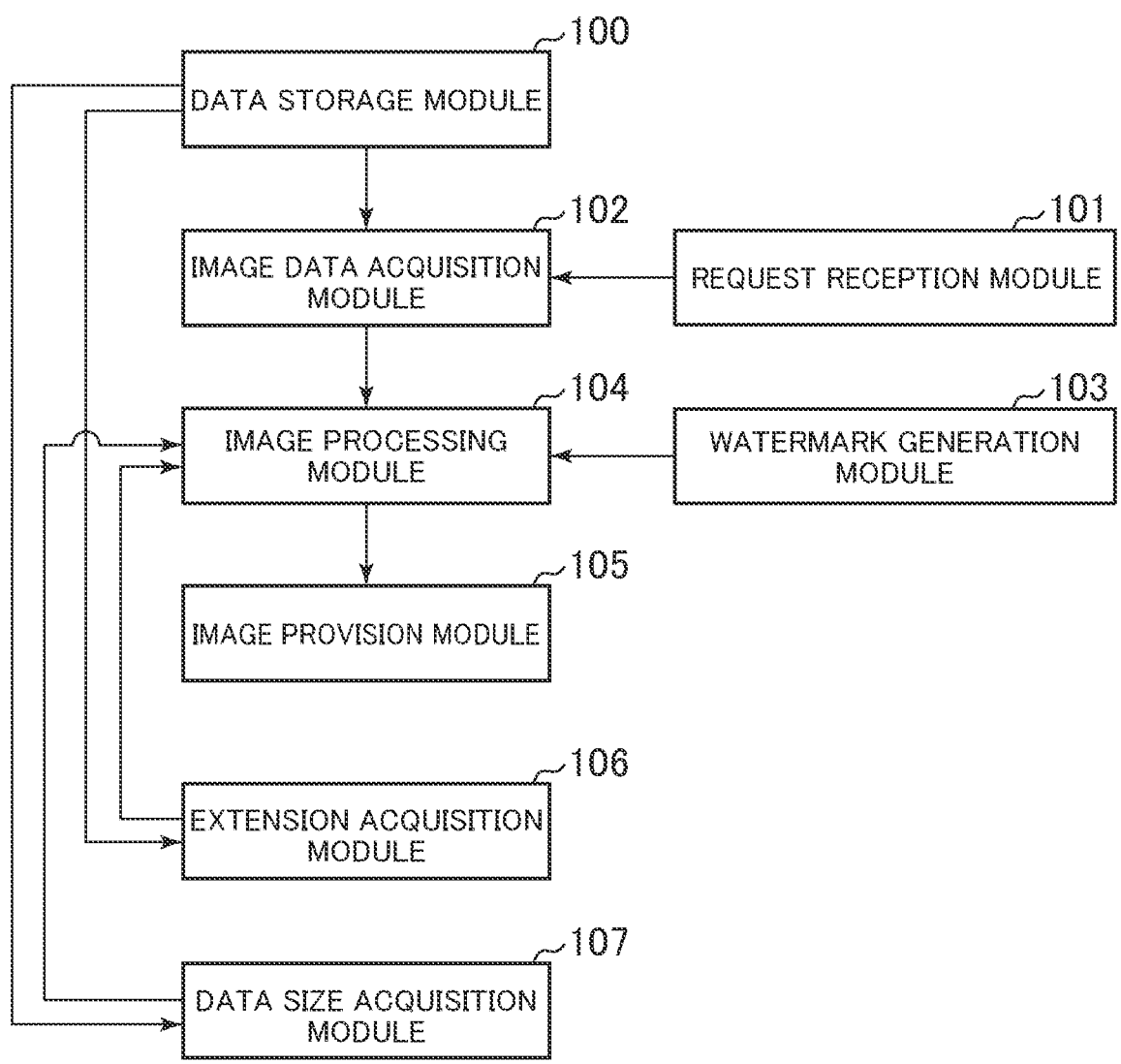
FIG. 8 is a functional block diagram for illustrating modification examples of the present invention.

FIG. 8 is a functional block diagram of modification examples of the present invention. As illustrated in FIG. 8, in the modification examples described below, in addition to the functions of the embodiment, an extension acquisition module 106 (refer to Modification Example (3) of the present invention) and a data size acquisition module 107 (refer to Modification Example (4) of the present invention) are implemented.

(1) For example, in the embodiment, a description has been given of the case in which the watermarks are embedded only in a single color channel, but the watermarks may be embedded in each of the plurality of color channels. In the following, a description is given of a case in which the watermarks are embedded in all color channels of a color image having a plurality of color channels.

The image processing module 104 in Modification Example (1) of the present invention is configured to change the respective numerical values $R_{xy}$, $G_{xy}$, and $B_{xy}$ in the plurality of color channels contained in the pixel values of the color image, to thereby embed the respective watermarks having the plurality of sizes in each of the plurality of color channels.

Figure 9:
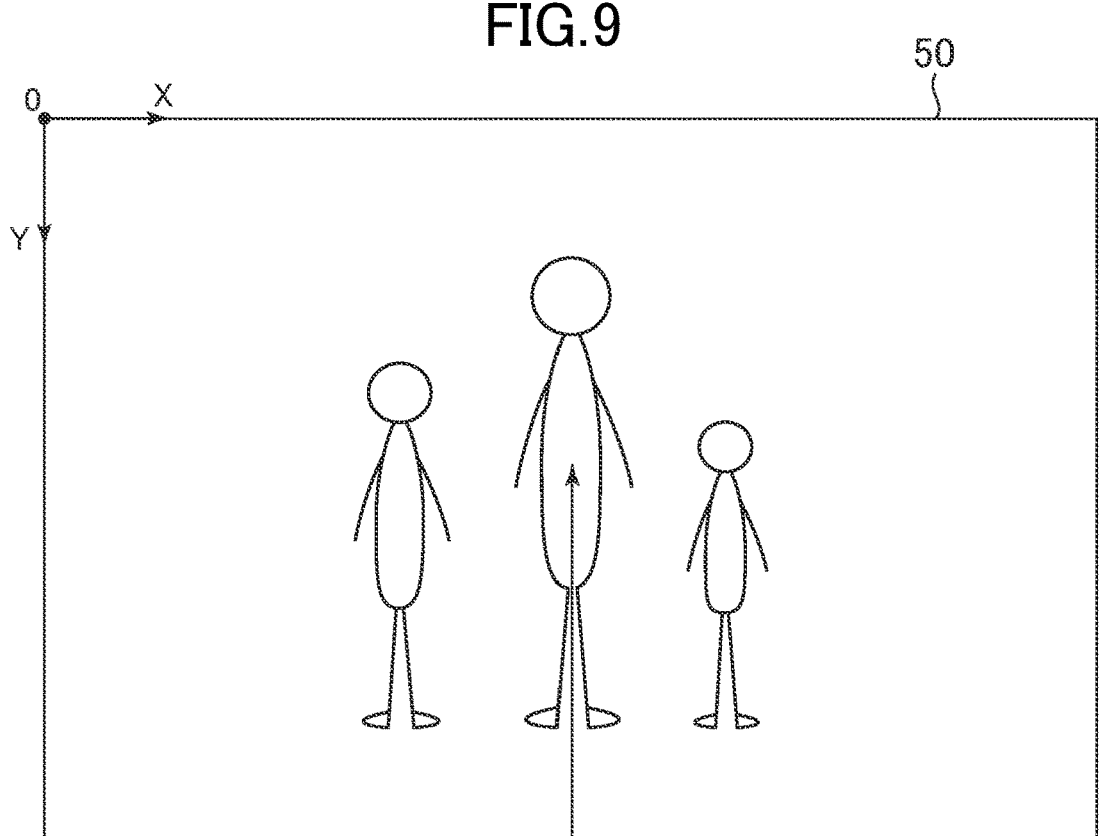
FIG. 9 is a diagram for illustrating how the watermarks are embedded in Modification Example (1).
Figure 9:
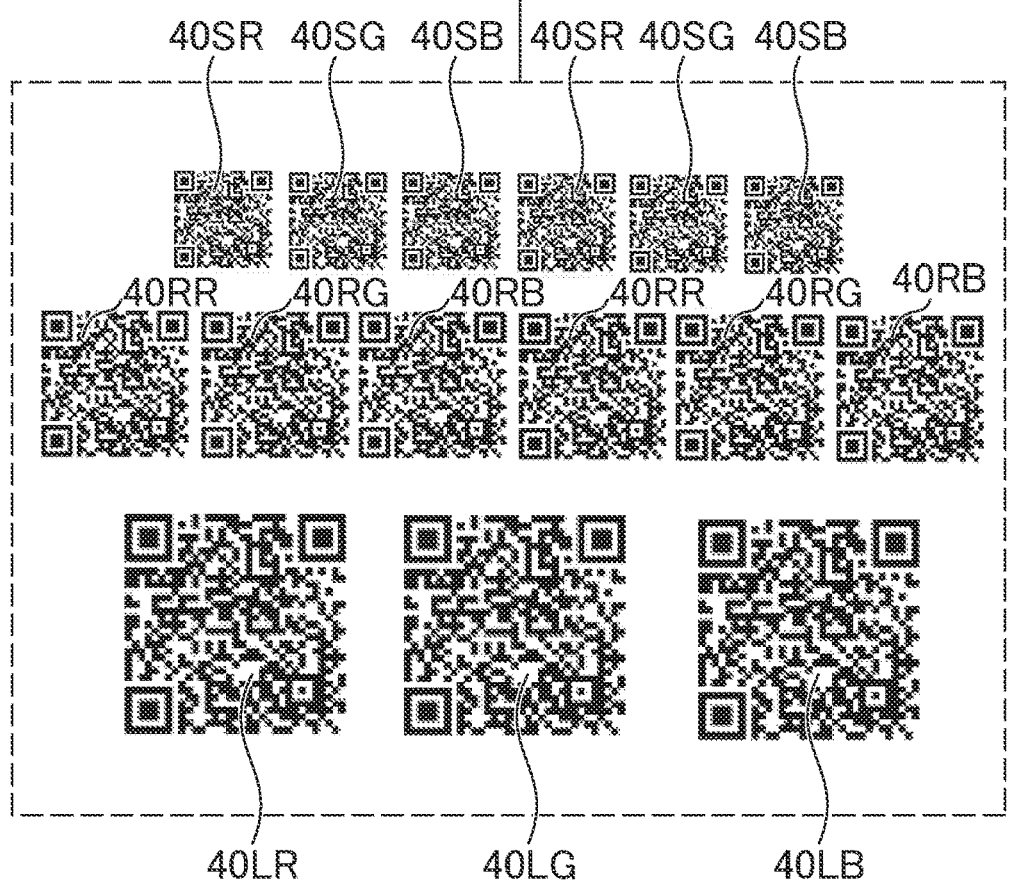

FIG. 9 is a diagram for illustrating how the watermarks are embedded in Modification Example (1). A description is given below of a case in which the sizes of the watermarks 40 are the same as those of the embodiment. In other words, a description is given of a case in which the watermarks 40 having the three sizes of 66%, 100%, and 150% are embedded. Watermarks 40SR, 40RR, and 40LR of FIG. 9 indicate watermarks to be embedded in the red channel. Watermarks 40SG, 40RG, and 40LG indicate watermarks to be embedded in the green channel. Watermarks 40SB, 40RB, and 40LB indicate watermarks to be embedded in the blue channel. The positions at which the respective watermarks 40 are to be embedded are only required to be determined based on a method determined in advance as in the embodiment. Moreover, in FIG. 9, the respective watermarks 40 are illustrated in black, but actually have colors (red, green, and blue) corresponding to the color channels.

A method of embedding the watermarks 40SR, 40RR, and 40LR is the same as the method described in the embodiment. The image processing module 104 does not change a pixel value ($R_{xy}$, $G_{xy}$, $B_{xy}$) of a pixel corresponding to the cell of "0" of each of the watermarks 40SG, 40RG, and 40LG, and changes the pixel value to ($R_{xy}$, $G_{xy}+1$, $B_{xy}$) of a pixel corresponding to the cell of "1" of each of the watermarks 40SG, 40RG, and 40LG. Similarly, the image processing module 104 does not change a pixel value ($R_{xy}$, $G_{xy}$, $B_{xy}$) of a pixel corresponding to the cell of "0" of each of the watermarks 40SB, 40RB, and 40LB, and changes the pixel value to ($R_{xy}$, $G_{xy}$, $B_{xy}+1$) of a pixel corresponding to the cell of "1" of each of the watermarks 40SB, 40RB, and 40LB. In this case, as in the embodiment, the invisibility of the watermark 40 is increased by decreasing the change in numerical value in each of the color channels.

A description has been given of the case in which the change amounts of the numerical values in the respective color channels are the same, but the change amount of the numerical values may be changed in accordance with the color channel. Moreover, the size of the watermark 40 may be changed in accordance with the color channel. In this case, the image processing module 104 may change the sizes of the watermarks so that the sizes are different from one another in one color channel, or so that the size of the watermarks in one color channel and the size of the watermarks in another color channel are different from each other. Further, the image processing module 104 may change the sizes of the watermarks so that the sizes are different from one another in accordance with the color channel.

With Modification Example (1), the watermarks are embedded in each of the plurality of color channels, and hence, even when apart of color channels have such a tendency that it is difficult to detect the watermark, but other color channels have such a tendency that it is easy to detect the watermark, the watermark can be detected. Thus, the certainty of detecting the watermark can be increased. Specifically, when a watermark is embedded in a region in which a color presents a gradation, a pixel value of a pixel in which the watermark is embedded may change so as to be the same as adjacent pixel values. However, for example, even when the green channel and the blue channel present gradations, when the red channel does not present a gradation, the watermarks embedded in the red channel can be detected. Further, watermarks different from one another may also be embedded in the respective color channels, and an amount of information to be embedded in the image can thus be increased.

The image processing module 104 may embed watermarks not in all the three color channels, but in any two of the color channels. Further, the color channel in which the watermarks are to be embedded may be fixed, or may be variable under a given condition. Moreover, in Modification Example (1), the watermark detection processing illustrated in FIG. 7 is carried out for each of the color channels. In other words, in S23, the histogram equalization processing is applied to each of the red channel, the green channel, and the blue channel to generate three histograms, and the processing starting from Step S24 is carried out for each of the three histograms. Therefore, for example, in S26 or S30, when the watermark is determined to be complete in any one of the color channels, the message in the watermark can be read even when the watermarks in other color channels are not complete, and hence the processing proceeds to the processing in Step S27.

(2) Moreover, for example, in Modification Example (1), as illustrated in FIG. 9, a case in which the watermarks in the respective color channels do not overlap one another is exemplified. However, the watermark in one color channel and a watermark in another color channel can be independently detected (for example, even when the watermark in the red channel and the watermark in the green channel overlap each other, this does not mean that the colors are mixed with each other and the watermarks thus do not become undistinguishable, and the region in which the numerical values have changed can be identified by extracting only the red channel component or the green channel component), and hence the watermarks in the respective color channels may overlap each other. The image processing module 104 in Modification Example (2) of the present invention is configured to embed the watermarks having the respective sizes so that a part or all of the watermarks embedded in each of the color channels overlap one another.

For example, the image processing module 104 determines positions at which the watermarks are to be embedded so that a part of the watermarks to be embedded in the red channel and a part of the watermarks to be embedded in the green channel or the blue channel overlap one another. Moreover, for example, the image processing module 104 determines positions at which the watermarks are to be embedded so that the watermarks to be embedded in the red channel contain all watermarks to be embedded in the green channel or the blue channel. The watermarks may be embedded at the same positions in the respective color channels.

With Modification Example (2), the watermarks in the respective color channels can be arranged so as to overlap one another. Thus, a space can efficiently be used, thereby increasing the number of watermarks to be embedded in the image. Moreover, the large watermarks resistant against the compression and the reduction in size and the small watermarks resistant against the cutting and the painting over can be arranged so as to overlap one another by arranging the watermarks having the plurality of sizes so as to overlap one another. Thus, even when the image is only partially cut or the image is compressed or reduced in size, the watermarks can more securely be detected, and hence identification of the user who disclosed the image is facilitated.

(3) Moreover, for example, in the embodiment, a description has been given of the case in which the watermarks having the predetermined sizes are embedded in the image, but, for an image that is highly likely to be compressed or reduced in size, the watermarks may be increased in order to withstand the compression or the reduction in size. For example, whether or not the probability of the compression or the reduction in size is high may be predicted based on the extension of image data, and when the probability is high, the size of the watermark may be increased.

The image processing system 1 in Modification Example (3) of the present invention includes the extension acquisition module 106. The extension acquisition module 106 is implemented mainly by the controller 11. The extension acquisition module 106 is configured to acquire the extension of the image data acquired by the image data acquisition module 102. The extension acquisition module 106 may acquire the extension from a file name of the image data, or may acquire the extension from information (for example, a property) associated with the image data. In this case, the extension is stored in the image database, and hence the extension acquisition module 106 may refer to the image database, to thereby acquire the extension.

The watermark generation module 103 determines the sizes of the watermarks to be generated based on the extension acquired by the extension acquisition module 106. For example, it is assumed that an association between the types of the extension and the sizes of the watermarks to be generated is stored in the data storage module 100. This association may be in a table form, or may be described in a program code in an arithmetic expression form. The watermark generation module 103 generates the watermarks having the sizes associated with the extension acquired by the extension acquisition module 106.

For example, BMP data and TIFF data are relatively large in data size, and are thus highly likely to be compressed or reduced in size. Meanwhile, GIF data and JPEG data are relatively small in data size, and are thus less likely to be compressed or reduced in size. The watermark generation module 103 increases the sizes of the watermarks when the extension acquired by the extension acquisition module 106 indicates BMP data or TIFF data compared with a case in which the extension acquired by the extension acquisition module 106 indicates GIF data or JPEG data.

With Modification Example (3), the processing method that may be used by the user can be predicted from the extension of the image data, and the watermarks having the sizes corresponding to the processing method can be embedded. Thus, the probability of the detection of the watermarks can be further increased.

(4) Moreover, for example, in Modification Example (3), the case in which the sizes of the watermarks are determined based on the extension is exemplified, but the sizes of the watermarks may be determined based on a data size of the image data.

The image processing system 1 in Modification Example (4) of the present invention includes the data size acquisition module 107. The data size acquisition module 107 is implemented mainly by the controller 11. The data size acquisition module 107 is configured to acquire the data size of the image data acquired by the image data acquisition module 102. The data size acquisition module 107 may acquire the data size from information (for example, the property) associated with the image data. In this case, the data size is stored in the image database, and hence the extension acquisition module 106 may refer to the image database, to thereby acquire the data size.

The watermark generation module 103 determines the sizes of the watermarks to be generated based on the data size acquired by the data size acquisition module 107. For example, it is assumed that an association between the data sizes and the sizes of the watermarks to be generated is stored in the data storage module 100. This association may be in a table form, or may be described in a program code in an arithmetic expression form. The watermark generation module 103 generates the watermarks having the sizes associated with the data size acquired by the data size acquisition module 107.

For example, as the data size increases, the probability of compressing or reducing the size of the image data increases, and hence the watermark generation module 103 increases the sizes of the watermarks. In other words, as the data size is reduced, the probability of compressing or reducing the size of the image data is reduced, and hence the watermark generation module 103 reduces the sizes of the watermarks.

With Modification Example (4), the processing method can be predicted from the extension of the image data, and the watermarks having the sizes corresponding to the processing method can be embedded. Thus, the probability of the detection of the watermarks can be further increased.

(5) Moreover, for example, in the embodiment, a description has been given of the case in which the positions at which the watermarks are to be embedded are fixed or randomly determined, but a region close to a center of an image is likely to be cut, and hence small watermarks resistant against the cutting may be arranged in the region close to the center.

The image processing module 104 in Modification Example (5) of the present invention is configured to determine the positions at which the respective watermarks having the plurality of sizes are to be embedded so that the sizes are reduced as the positions approach the center of the image. In other words, the image processing module 104 determines the positions at which the respective watermarks having the plurality of sizes are to be embedded so that the sizes increases as the positions approach ends of the image. For example, the image processing module 104 embeds the watermarks having the smallest size out of the watermarks generated by the watermark generation module 103 at positions within a predetermined distance from the coordinates of the center point of the image 50. In other words, the image processing module 104 embeds the watermarks having the largest size out of the watermarks generated by the watermark generation module 103 at positions separated by a predetermined distance or more from the coordinates of the center point of the image 50.

With Modification Example (5), the processing method can be predicted from the data size of the image data, and the watermarks having the sizes corresponding to the processing method can be embedded. Thus, the probability of the detection of the watermarks can be further increased.

(6) Moreover, for example, the watermarks having the respective sizes are not embedded in a scattered manner, but a plurality of water mark groups, each of which is a cluster of watermarks having a plurality of sizes, may be embedded.

Figure 10:
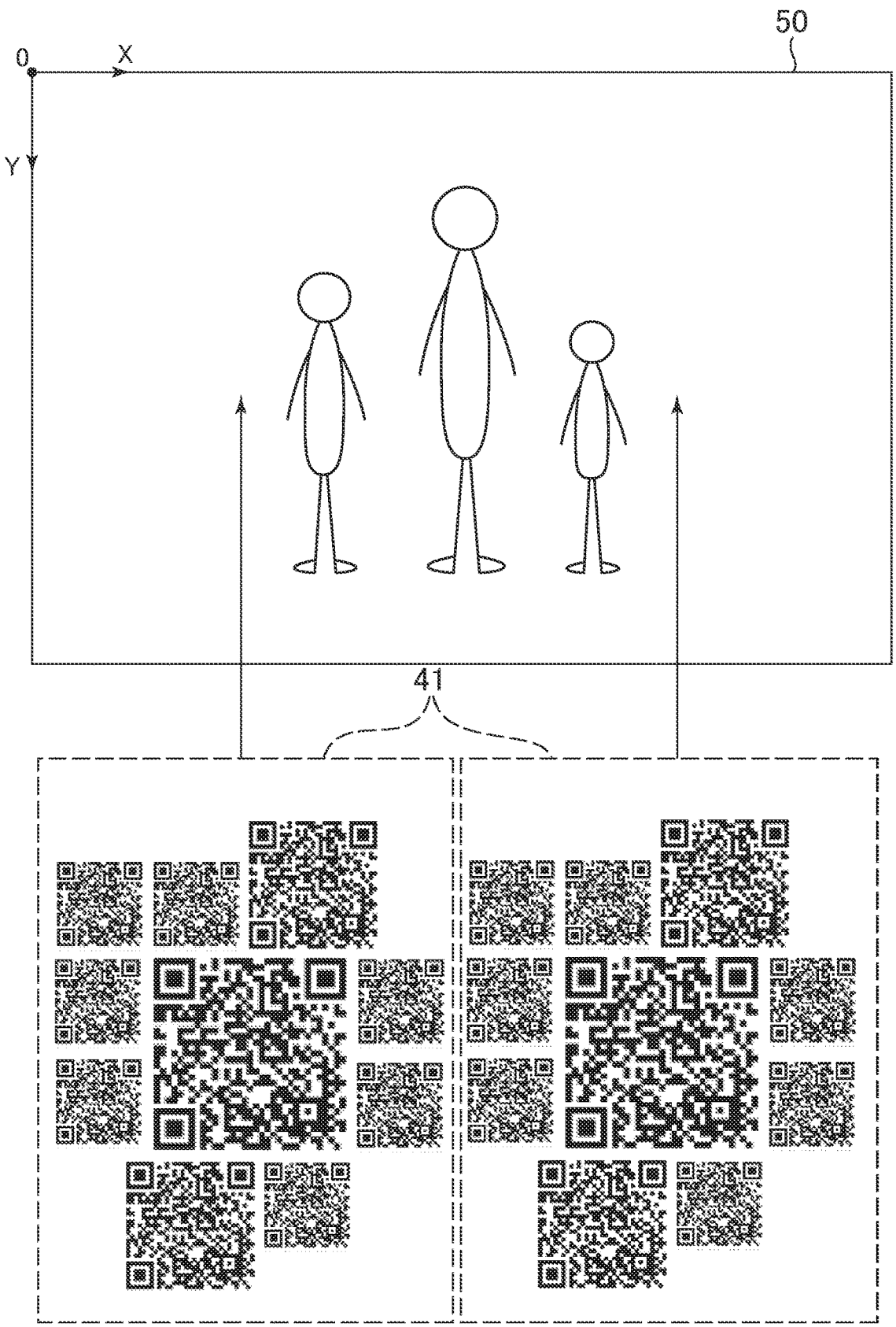
FIG. 10 is a diagram for illustrating how watermark groups are embedded.

FIG. 10 is a diagram for illustrating how the watermark groups are embedded. In FIG. 10, the group of the watermarks having a plurality of sizes is referred to as watermark group 41. As illustrated in FIG. 10, the watermark group 41 includes the watermarks 40 having the three sizes described in the embodiment. The image processing module 104 in Modification Example (6) of the present invention is configured to embed a plurality of watermark groups 41 each including the watermarks having the respective sizes in the image 50.

For example, the image processing module 104 determines the numbers and arrangement of the respective watermarks 40 in the watermark group 41. In this case, the largest watermark 40L is arranged at the center, and the smaller watermarks 40S and 40R are arranged therearound. At least one of the sizes, the numbers, and the arrangement of the watermarks may be different in accordance with the watermark group 41. Moreover, the watermark group 41 is only required to contain a plurality of watermarks 40 different from one another in size, and the number of the watermarks 40 having each of the sizes may be one or at least two.

With Modification Example (6), the plurality of watermark groups are embedded, and hence the probability of detecting the watermarks can be further increased.

(7) Moreover, for example, two or more of Modification Examples (1) to (6) may be combined.

Moreover, for example, in the above description, the same information is contained in the watermarks having the respective sizes, but the watermark generation module 103 may generate watermarks containing pieces of information different from one another in accordance with the size. With this configuration, the amount of information to be embedded in the image can be increased. Moreover, the watermark generation module 103 may change the error correction levels so that the error correction levels are different in accordance with the size. For example, the error correction level may be decreased as the size increases, and the error correction level may be increased as the size is reduced.

Moreover, for example, a description has been given of the case in which directions of all the watermarks are the same, but the directions of the watermarks may be different from one another. In other words, the directions of the watermarks to be embedded in the plurality of color channels may be different from one another. The image processing module 104 may change the directions of the watermarks so that the directions of the watermarks are different from one another in one size, or so that the direction of the watermarks in one size and the direction of the watermarks in another size are different from each other. Further, the image processing module 104 may embed the watermarks so that the directions of the watermarks are different from one another in accordance with the size.

Moreover, for example, the image processing module 104 may carry out the histogram equalization processing for each of the color channels, to thereby embed the watermarks in a color channel having a sparse color distribution. Further, the image processing module 104 may carry out the histogram equalization processing in each of regions in the color image, to thereby embed the watermarks in a region having a sparse color distribution. Whether or not the color distribution is sparse is only required to be determined based on a frequency at a peak and a distance between peaks, which appear in the histogram. For example, the image processing module 104 may determine that the color distribution is sparse when the number of gradation values each having a frequency equal to or more than a first threshold is equal to or more than a reference, when the number of gradation values each having a frequency equal to or more than a second threshold, which is less than the first threshold, is less than a reference, or when distances each between peaks are more than a predetermined distance (the predetermined distance may be a distance in accordance with the change amount of the numerical values exhibited when the watermark is embedded). Moreover, for example, in Modification Example (1), the image processing module 104 may embed watermarks only in a color channel having a sparse color distribution.

Moreover, for example, a description has been given of the case in which the watermarks are embedded in the still image data, but watermarks may be embedded in moving image data. Further, a code other than the 2D code may be used as the watermark, and an image and a text other than the code may be used as the watermark. Moreover, for example, any information may be contained in the watermark, and information other than the information on the user who has requested the image data may be contained.

Moreover, for example, the functions described as being implemented in the image processing server 10 may be implemented in another computer (for example, the user terminal 20 or the administrator terminal 30). In this case, the computer in which the functions described above are implemented corresponds to the image processing device of the present invention. Moreover, out of the above-mentioned functions, functions other than the image data acquisition module 102, the watermark generation module 103, and the image processing module 104 may be omitted.

The invention claimed is:

1. An image processing device, comprising at least one processor configured to:
   acquire image data;
   acquire an extension from a file name of the image data;
   determine a plurality of sizes of watermarks to be generated based on the extension;
   generate the watermarks having the determined plurality of sizes; and
   embed the respective watermarks in an image indicated by the image data.

2. The image processing device according to claim 1,
   wherein the image includes a color image having a plurality of color channels, and
   wherein the at least one processor is configured to embed the respective watermarks in each of the plurality of color channels by changing respective numerical values in the plurality of color channels contained in a pixel value of the color image.

3. The image processing device according to claim 2, wherein the at least one processor is configured to embed the watermarks so that a part or all of the watermarks embedded in each of the plurality of color channels overlap one another.

4. The image processing device according to claim 1,
   wherein the at least one processor is configured to receive a request for the image data by a user,
   wherein the watermark contains information for identifying the user requesting the image data, and
   wherein the at least one processor is configured to provide the image data in which the watermark is embedded to the user who has made the request.

5. The image processing device according to claim 1,
   wherein the watermark includes a 2D code having a plurality of error collection levels, and
   wherein the at least one processor is configured to generate, for each of the plurality of sizes, the 2D code having an error correction level equal to or higher than a reference value.

6. The image processing device according to claim 1, wherein the at least one processor is configured to determine positions at which the respective watermarks having the plurality of sizes are to be embedded so that a size of each of the watermarks is reduced as a position of each of the watermarks approaches a center of the image.

7. The image processing device according to claim 1, wherein the at least one processor is configured to embed a plurality of watermark groups each including the respective watermarks having the plurality of sizes in an image.

8. An image processing method, comprising:
acquiring image data;
acquiring an extension from a file name of the image data;
determining a plurality of sizes of watermarks to be generated based on the extension;
generating the watermarks having the determined plurality of sizes; and
embedding the respective watermarks in an image indicated by the image data.

9. A non-transitory computer-readable information storage medium for storing a program for causing a computer to:
acquire image data;
acquire an extension from a file name of the image data;
determine a plurality of sizes of watermarks to be generated based on the extension;
generate the watermarks having the determined plurality of sizes; and
embed the watermarks having the respective sizes in an image indicated by the image data.

\* \* \* \* \*